United States Patent
Blazer et al.

(10) Patent No.: US 6,424,772 B1
(45) Date of Patent: Jul. 23, 2002

(54) FIBER OPTIC CABLE PRODUCT AND ASSOCIATED FABRICATION METHOD AND APPARATUS

(75) Inventors: Bradley J. Blazer, Granite Falls; Warren W. McAlpine, Hickory, both of NC (US); Mary Ann Clarke, Pearisburg, VA (US); Bruce E. Townsend; Harriet G. Cooke, both of Hickory, NC (US)

(73) Assignee: Corning Cable Systems, LLC, Hickory, NC (US)

( * ) Notice: Subject to any disclaimer, the term of this patent is extended or adjusted under 35 U.S.C. 154(b) by 0 days.

(21) Appl. No.: 09/451,370

(22) Filed: Nov. 30, 1999

(51) Int. Cl.[7] .................................. G02B 6/44
(52) U.S. Cl. ..................... 385/110; 385/112; 385/109; 385/114
(58) Field of Search ............... 385/103, 105, 385/110, 111, 112, 113, 114

(56) References Cited

U.S. PATENT DOCUMENTS

| | | | |
|---|---|---|---|
| 4,272,472 A | 6/1981 | Hulin et al. | 264/146 |
| 4,315,098 A | 2/1982 | Dougherty et al. | 174/15 S |
| 4,435,238 A | 3/1984 | Smith | 156/171 |
| 4,596,443 A | 6/1986 | Diemeer et al. | 350/96.23 |
| 4,781,434 A | 11/1988 | Kitagawa et al. | 350/96.23 |
| 4,784,462 A | 11/1988 | Priaroggia | 350/96.23 |
| 4,953,942 A | 9/1990 | Sasaki | 350/96.23 |
| 5,218,659 A | 6/1993 | Schneider | 385/110 |
| 5,222,178 A | 6/1993 | Betker et al. | 385/110 |
| 5,920,672 A * | 7/1999 | White | 385/110 |
| 6,160,940 A * | 12/2000 | Summers et al. | 385/110 |
| 6,185,351 B1 * | 2/2001 | Daneshvar et al. | 385/114 |

FOREIGN PATENT DOCUMENTS

| | | |
|---|---|---|
| EP | 0 725 466 A1 | 7/1996 |
| FR | 0 488 698 | 2/1982 |
| JP | 7-128557 | 5/1995 |
| JP | 7-218784 | 8/1995 |
| JP | 8-211263 | 8/1996 |

* cited by examiner

Primary Examiner—Hemang Sanghavi
Assistant Examiner—Scott Knauss
(74) Attorney, Agent, or Firm—Timothy J. Aberle

(57) ABSTRACT

A fiber optic cable product is provided that includes a strength member and an elongate cable core surrounding and mechanically coupled to the strength member. The cable core defines a number of lengthwise extending slots for receiving optical fibers and a number of voids proximate the strength member that also typically extend lengthwise therethrough. The fiber optic cable product is therefore relatively lightweight and flexible. In order to insure that the mechanical properties of the fiber optic cable product are uniform, the cable core typically defines the voids in a generally symmetrical manner about the central strength member. A method and an apparatus for extruding a fiber optic cable product that includes a cable core defining a plurality of voids are also disclosed.

31 Claims, 4 Drawing Sheets

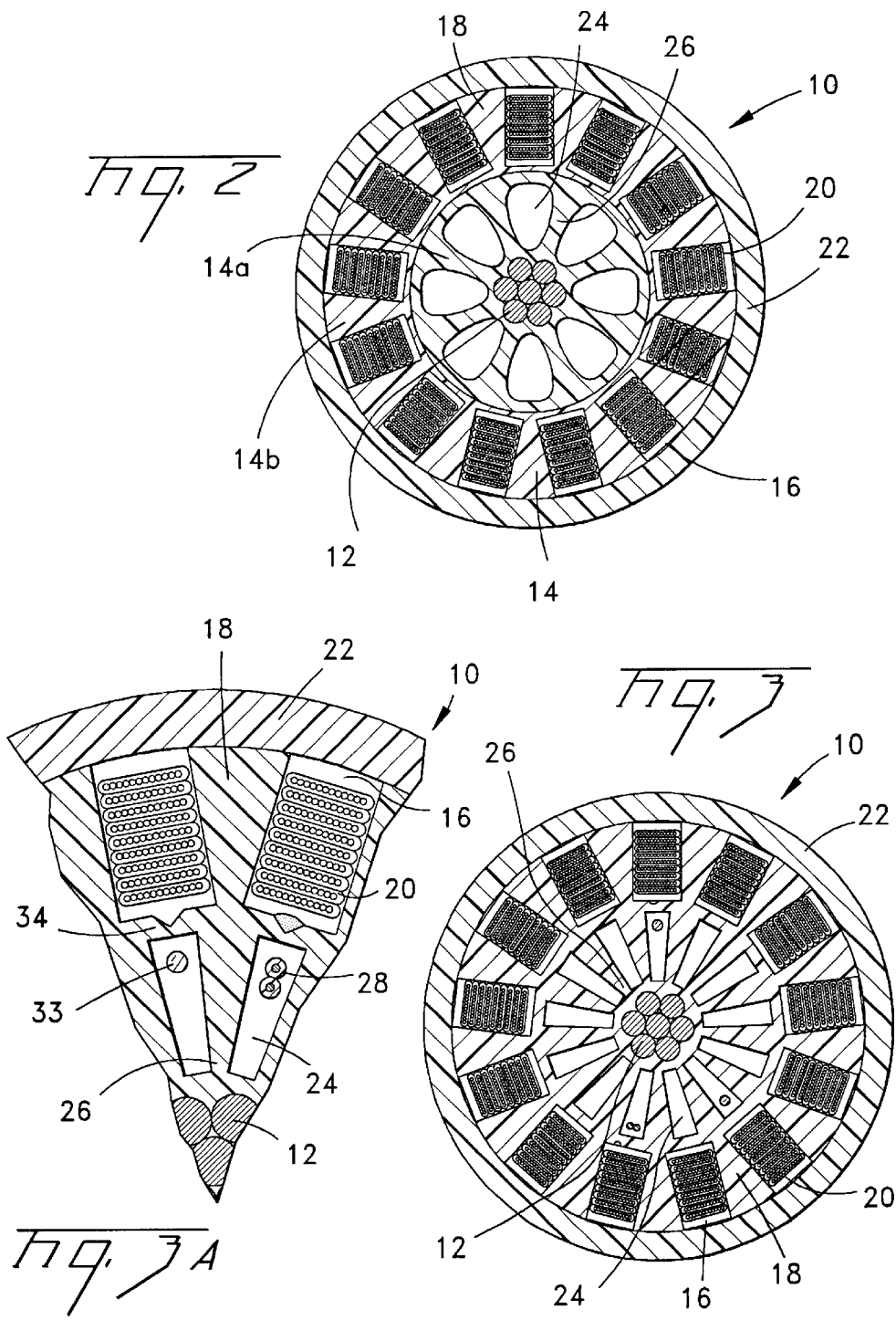

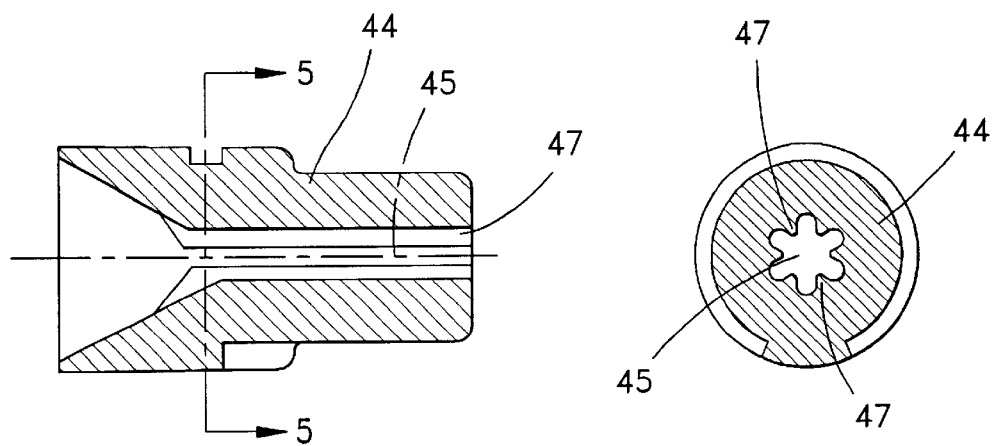
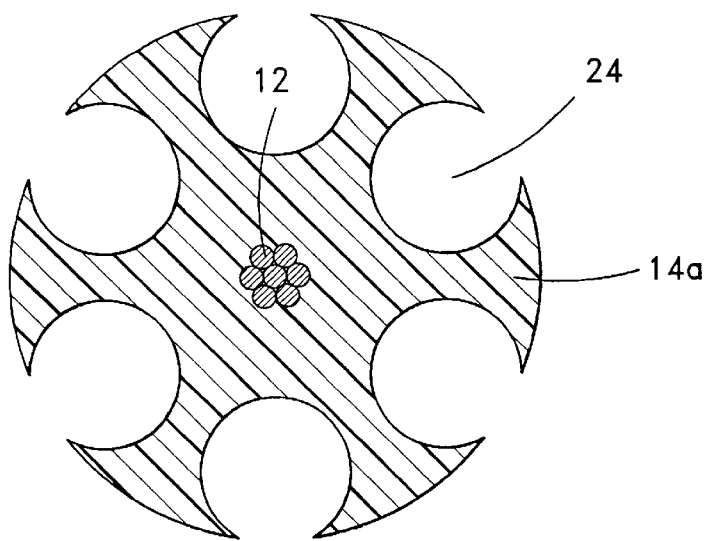

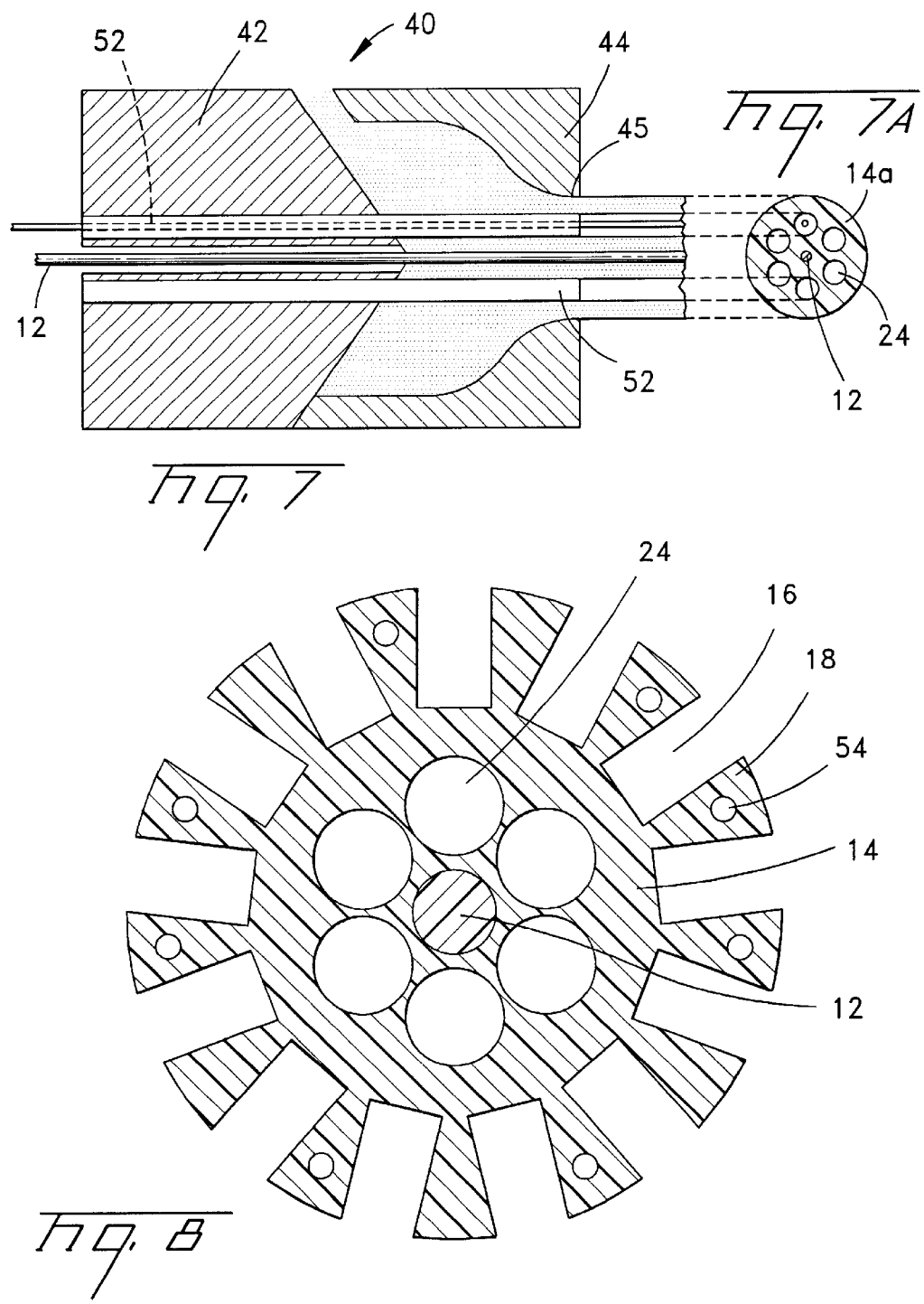

FIBER OPTIC CABLE PRODUCT AND ASSOCIATED FABRICATION METHOD AND APPARATUS

FIELD OF THE INVENTION

The present invention relates generally to a fiber optic cable and an associated fabrication method and apparatus and, more particularly, to a fiber optic cable having a slotted core and an associated fabrication method and apparatus.

BACKGROUND OF THE INVENTION

One common fiber optic cable design includes a slotted cable core in which the outer surface of the cable core defines a number of lengthwise extending slots. Typically, the slots have a helical lay configuration, although the slots can have other configurations such as an S-Z stranded lay configuration or a linear configuration. The slotted cable core is typically formed around a center strength member which, in turn, is commonly formed of a plurality of stranded steel strength members, a single steel rod, or a glass or aramid fiber reinforced plastic member that imparts strength to the fiber optic cable and resists buckling. A fiber optic cable having a slotted cable core also includes a plurality of optical fibers disposed within the slots and a protective jacket that surrounds the cable core and the optical fibers, thereby protecting the optical fibers.

Fiber optic cables having slotted cable cores are typically formed by extruding the slotted cable core over the central strength member. In this regard, the central strength member typically passes through an extruder and a molten material, such as a molten thermoplastic material, is extruded under pressure about the central strength member. The central strength member and the surrounding thermoplastic material emerge from the extruder through a die opening. The shape of the die opening defines the shape of the outer surface of the thermoplastic material extruded over the central strength member. For example, the die opening can include a number of inwardly extending teeth or projections that define respective slots in the cable core.

As the thermoplastic material cools, the thermoplastic material hardens into a final shape. During the cooling process, the extruded thermoplastic material may become somewhat deformed due to the effects of gravity upon the soft mass of thermoplastic material. This deformation is termed slumping. In order to limit the adverse effects of slumping, the cable core can be extruded in two stages with an inner portion of the cable core initially extruded around the central strength member, and an outer portion of the cable core thereafter being extruded about the inner portion of the cable core. By extruding the cable core in two stages, each portion of the cable core can cure more quickly and uniformly, thereby reducing slumping.

Once the cable core has cured, optical fibers, such as ribbons of optical fibers, can be disposed within the slots defined by the cable core. An outer protective jacket can then be extruded over the cable core and the optical fibers in order to complete the fabrication of the fiber optic cable.

Fiber optic cables are generally designed to meet or exceed predetermined product specifications. Among other parameters, these specifications commonly define the weight, the tensile strength, the flexibility and the crush resistance of the fiber optic cables, with fiber optic cables that are lighter, stronger, more flexible and/or more crush resistant being generally more preferred.

While the demand for fiber optic cable continues to escalate, the demand for fiber optic cables having a large count of optical fibers, such as a thousand or more optical fibers, is especially increasing. Although fiber optic cables having large counts of optical fibers are available, these fiber optic cables oftentimes are quite heavy and somewhat inflexible. As such, the installation of these fiber optic cables having large counts of optical fibers can be somewhat cumbersome. As such, fiber optic cables, such as large count fiber optic cables, that are lighter and more flexible than conventional fiber optic cables are desired.

SUMMARY OF THE INVENTION

In view of the foregoing, a fiber optic cable product according to one aspect of the present invention includes a strength member and an elongate cable core surrounding a and mechanically coupled to the strength member such that the strength member extends lengthwise therethrough, wherein the cable core defines a plurality of lengthwise extending slots and the cable core also defines a plurality of voids proximate the strength member and disposed in a symmetrical arrangement thereabout. According to another aspect of the present invention, a fiber optic cable product includes a strength member and an elongate cable core surrounding and mechanically coupled to the strength member such that the strength member extends lengthwise therethrough, wherein the cable core defines a plurality of lengthwise extending slots and the cable core also defines a plurality of voids proximate the strength member and extending lengthwise through the cable core. According to either aspect of the present invention, the fiber optic cable product is advantageously lighter and more flexible than a conventional fiber optic cable product of the same size and construction as a result of the plurality of voids defined by the cable core.

A method for forming a fiber optic cable product is also provided according to another aspect of the present invention and includes the steps of providing a lengthwise extending strength member and extruding a cable core around the strength member such that the cable core is mechanically coupled thereto, wherein the extruding step includes the steps of defining a plurality of voids proximate the strength member and extending lengthwise through the cable core and defining a plurality of outwardly opening slots extending lengthwise along the cable core. The extrusion of the cable core can be performed in either one step in which the slots and the voids are formed concurrently, or in two steps in which an inner portion of the cable core that defines the voids can be extruded prior to extruding thereabout an outer portion of the cable core that defines the slots. Regardless of the manner in which the cable core is extruded, optical fibers can then be disposed in the slots defined by the cable core and a protective jacket can be extruded around the cable core and the optical fibers to complete the fabrication of the fiber optic cable.

An apparatus for extruding at least a portion of a cable core having an outer surface with a predetermined shape is also provided according to another aspect of the present invention and includes an extruder having an extruder die that defines a die opening that serves to shape the outer surface of the cable core and an extruder tip that cooperates with the extruder die to at least partially define an internal cavity into which molten thermoplastic material is introduced prior to being forced through the die opening, and that further includes a plurality of calibration veins that extend from the extruder tip and through at least a portion of the internal cavity of the extruder to define a plurality of voids that are internal to the cable core without opening through the outer surface of the cable core. Typically, the calibration veins serve not only to define the voids, but also to maintain the size and shape of the voids as the cable core cures, thereby avoiding distortion of the voids. In this regard, the plurality of calibration veins can extend outwardly from the internal cavity and through the die opening and/or the calibration veins can define tubular passageways through which gas can be injected into the voids defined by the cable core.

BRIEF DESCRIPTION OF THE DRAWINGS

FIG. 2 is a cross-sectional view of a fiber optic cable according to another embodiment of the present invention in which the voids have an egg-like shape.

FIG. 3 is a cross-sectional view of a fiber optic cable according to another embodiment of the present invention in which the voids have a trapezoidal shape.

FIG. 3A is a fragmentary cross-sectional view of a portion of a fiber optic cable similar to the fiber optic cable of FIG. 3 which depicts a ripcord and a pair of electrical conductors disposed within respective voids.

FIG. 4 is a cross-sectional view of an extrusion die for forming an inner portion of the cable core according to one embodiment of the present invention.

FIG. 5 is a cross-sectional view taken along line 5—5 of FIG. 4 illustrating the shape of the die opening defined by the extrusion die of FIG. 4.

FIG. 6 is a cross-sectional view of the inner portion of the cable core formed by the extrusion die of FIGS. 4 and 5.

FIG. 7 is a cross-sectional view of an extrusion die having calibration veins for defining the voids in the cable core of the resulting fiber optic cable.

FIG. 7A is a cross-sectional view of the inner portion of the cable core formed by the extrusion die of FIG. 7.

FIG. 8 is a cross-sectional view of a cable core extruded in a single step according to another embodiment of the present invention in which the radially extending ribs that separate the slots also define voids.

DETAILED DESCRIPTION OF THE INVENTION

Figure 1:
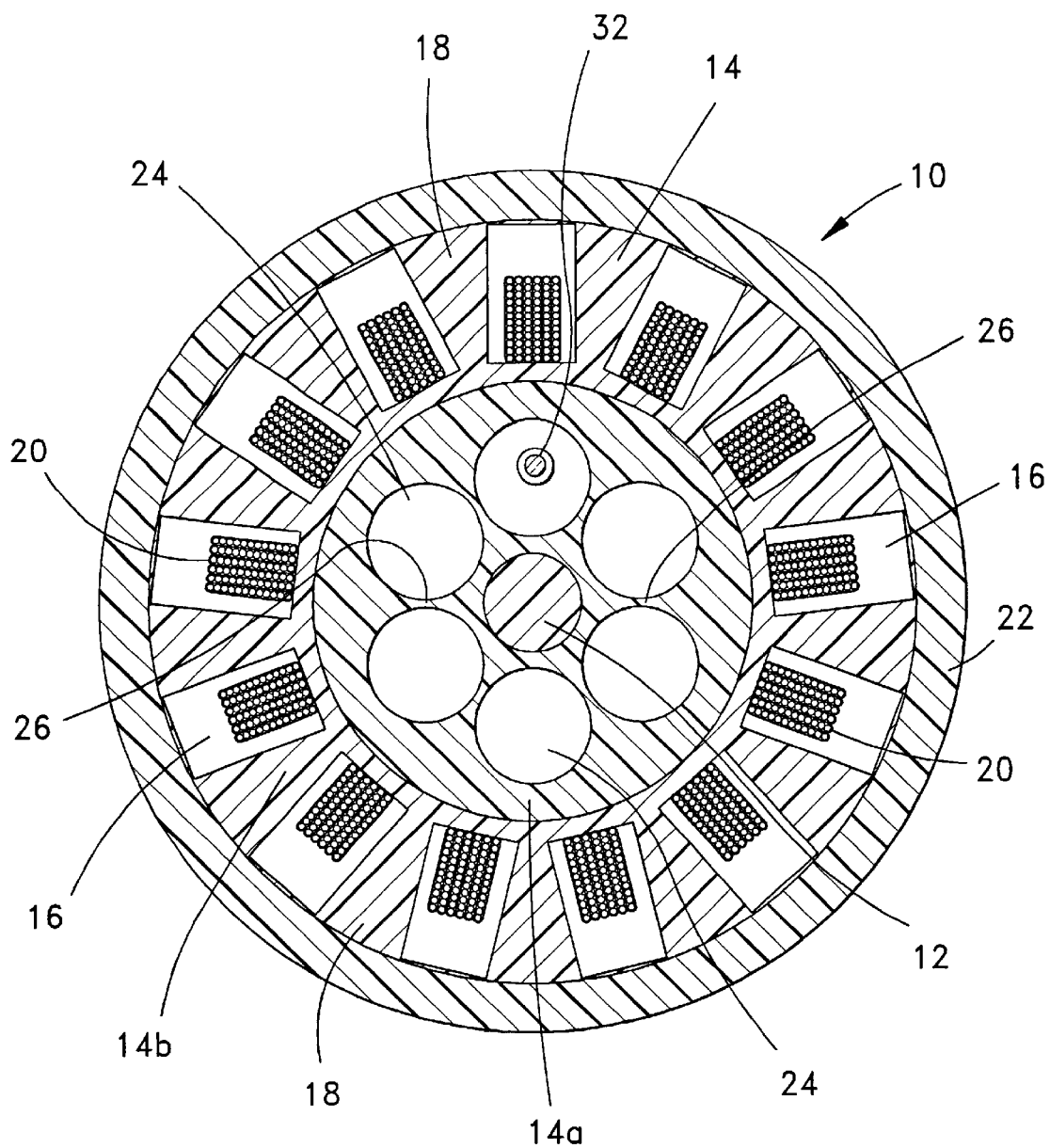
FIG. 1 is a cross-sectional view of a fiber optic cable according to one embodiment of the present invention in which the voids have a circular shape.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a fiber optic cable 10 according to one advantageous embodiment to the present invention is illustrated. Fiber optic cable 10 includes a central strength member 12 and a cable core 14 surrounding and mechanically coupled to strength member 12 such that strength member 12 extends lengthwise therethrough. As shown in FIG. 1, central strength member 12 can be a steel rod. However, central strength member 12 can be formed of a plurality of stranded metallic members, such as steel members. Alternatively, central strength member 12 can be formed of a glass reinforced or an aramid reinforced plastic member. Regardless of its construction, central strength member 12 imparts tensile strength to fiber optic cable 10, while resisting buckling.

Cable core 14 that surrounds and is mechanically coupled to central strength member 12 is typically formed of a plastic material that is extruded about central strength member 12, as described below. While other plastic materials can be utilized, the cable core 14 is typically formed of a polyolefin, such as polyethylene and polypropylene. Of these, cable core 14 is most commonly formed of either high-density polyethylene or medium density polyethylene. Although not necessary for the practice of the present invention, the plastic that forms any layer of thermoplastic cable core 14 can have a cellularized structure as described in U.S. Pat. No. 5,920,672 which issued Jul. 6, 1999 to Kevin T. White, the contents of which are incorporated herein by reference. For example, the plastic that forms cable core 14 can be foamed or otherwise processed so as to have a cellularized structure. However, cable core 14 can be non-cellularized.

Cable core 14 defines a number of lengthwise extending slots 16. Slots 16 open radially outward and are separated by radially extending ribs 18. The lay of slots 16 is typically helical, although cable core 14 can define other lay configurations, such as an SZ stranded lay configuration. Additionally, although slots 16 are shown to have a rectangular shape in lateral cross-section in FIG. 1, the slots 16 can have other cross-sectional shapes. Regardless of the configuration and shape of slots 16, ribs 18 that separate slots 16 preferably have a minimum thickness that provides for sufficient crush resistance and other desirable mechanical properties. In one embodiment, for example, each rib has a minimum thickness of at least 1 millimeter. The radially inner sides of slots 16 define a pitch circle about the center of the cable. In a preferred embodiment, voids 24 account for 15% to 90% of the cross sectional area between the strength member and the pitch circle. More preferably, voids 24 account for about 25 to 75% of the cross sectional area.

As shown in FIG. 1, fiber optic cable 10 also preferably includes a plurality of optical fibers 20 disposed within slots 16 defined by cable core 14. Typically, several ribbons of optical fibers are disposed in each slot, although loose optical fibers or optical fibers in other formats can be disposed within slots 16, if so desired. As a result of the slotted core configuration, the fiber optic cable 10 of the present invention typically has a relatively high fiber count, such as 1,000 optical fibers or more. However, fiber optic cable 10 can have smaller counts of optical fibers, if so desired. In order to complete the construction of fiber optic cable 10, fiber optic cable 10 also typically includes an outer jacket 22 that surrounds cable core 14 and optical fibers 18 in order to protect optical fibers 18. Protective outer jacket 22 is typically formed of a plastic such as a polyolefin and, more particularly, such as a high-density polyethylene or a medium density polyethylene.

According to the present invention, cable core 14 also defines a plurality of voids 24 proximate strength member 12. Preferably, voids 24 are disposed in a symmetrical arrangement about central strength member 12 as shown in FIG. 1, such that the resulting fiber optic cable exhibits uniform mechanical properties. In addition, voids 24 generally extend lengthwise through cable core 14. Voids 24 can extend lengthwise in a helical configuration about central strength member 12. Alternatively, voids 24 can extend linearly through cable core 14, or the voids can be defined to have a variety of other configurations. Voids 24 can also have a variety of shapes in lateral cross-section. As shown in FIG. 1, for example, voids 24 can be, for example, generally circular in shape in lateral cross-section. Alternatively, voids 24 can have a tapered shape in lateral cross-sectional that becomes increasingly more narrow in a radially inward direction. As shown in FIG. 2, for example, voids 24 can have an egg-like shape with the smaller end of the egg shape located closer to the center of fiber optic cable 10. As a further illustration, voids 24 can have a trapezoidal shape in lateral cross-section with the smaller portions of the trapezoidally-shaped voids being nearer the center of fiber optic cable 10.

The shape and size of voids 24 can be designed so as to tailor the properties of fiber optic cable 10 as desired. In this regard, the size and the number of voids directly relates to the weight and flexibility of fiber optic cable 10 with fiber optic cables that include larger and more numerous voids being lighter and more flexible than similarly sized and constructed fiber optic cables 10 that define smaller and fewer voids. In addition, voids 24 may actually improve crush performance since voids 24 will permit cable core 14 to compress somewhat in order to absorb substantial crush loads without requiring ribs 18 that extend between slots 16 defined by cable core 14 to withstand the entire crush load. While voids 24 can be sized and shaped in different manners depending upon the desired characteristics of fiber optic cable 10 and the application in which fiber optic cable 10 is to be deployed, fiber optic cable 10 of one advantageous embodiment includes webs 26 that extend between and separate adjacent voids and that have a thickness in lateral cross-section of at least 1 millimeter.

As shown in FIGS. 1 and 3, voids 24 can be radially aligned with respective slots 16. Alternatively, at least some of the voids can be staggered relative to slots 16, as shown in FIG. 2. By staggering voids 24 relative to slots 16, the overall crush resistance of fiber optic cable 10 may be somewhat improved relative to a fiber optic cable design in which voids 24 and slots 16 are radially aligned. However, alignment of voids 24 with respective slots 16 may advantageously facilitate access to voids 24, as described below.

Fiber optic cable 10 can be designed such that voids 24 are empty as shown in FIG. 2. Alternatively, fiber optic cable 10 can include various elements disposed within voids 24. For example, electrical conductors 28, such as twisted pairs of conductors, can be disposed within voids 24 as shown in FIG. 3A. Alternatively, optical fibers 32 can be disposed within voids 24 such as by being pulled or blown into voids 24 following fabrication of cable core 14. Fiber optic cable 10 can also include additional strength elements disposed within voids 24. In addition, fiber optic cable 10 can include any suitable water blocking material, for example, water blocking yarns, grease or a foamed plastic filler disposed within one or more of the voids.

In some instances, it may be desirable to physically access a void 24 or the components disposed within the void. As such, a ripcord 33 can be disposed within a void. In addition, the web 34 that separates void 24 from an aligned slot 16 can have a frangible portion of reduced thickness, as shown in FIG. 3A. As such, void 24 or the components disposed within void 24 can be accessed by breaking the frangible portion, for example, by pulling ripcord 32. Although not illustrated, two adjacent slots can include frangible portions that can be broken by pulling a rib 18 therebetween for access to one or more voids 24. Additionally, cable core 14 can alternatively be defined such that a small opening extends between a void 24 and an aligned slot 16 through which void 24 and any components disposed within void 24 can be accessed. In this embodiment, a tape or other material layer can be disposed within slot 16 so as to cover the opening to void 24 until access to the void is desired, at which time the tape or other material layer can be removed.

Even if fiber optic cable 10 does not include any components disposed within voids 24, voids 24 permit fiber optic cable 10 to generally be lighter and more flexible than similarly sized fiber optic cables having a solid cable core. Since increased weight and stiffness generally inhibit the installation of fiber optic cable, fiber optic cable 10 of the present invention will generally be easier to install since cable core 14 will typically be lighter and can be flexed more easily than conventional, solid plastic cable cores without voids.

A method and apparatus for fabricating a fiber optic cable product is also provided according to other aspects of the present invention. In this regard, a lengthwise-extending strength member 12 is initially provided and a cable core 14 is extruded around the strength member such that cable core 14 is mechanically connected thereto. Typically, strength member 12 is drawn from a payoff and advanced through an extruder 40. As shown in more detail in FIG. 7, extruder 40, such as a cross head extruder, generally includes an extruder tip 42 and an extruder die 44 that cooperate to define an internal cavity through which strength member 12 is drawn and into which the molten thermoplastic material is injected. As strength member 12 passes through the internal cavity and out of extruder 40 through a die opening 46 defined by extruder die 44, the molten thermoplastic material is extruded about strength member 12 to form cable core 14.

According to the present invention, the thermoplastic material of cable core 14 is extruded about strength member 12 so as to define a plurality of voids 24 proximate strength member 12 and extending lengthwise through cable core 14. In addition, the thermoplastic material of cable core 14 is extruded around strength member 12 so as to define a plurality of outwardly opening slots 16 extending lengthwise along cable core 14. After cable core 14 has been extruded about central strength member 12, cable core 14 is cooled, typically by passing cable core 14 through a water trough. Although not necessary for the present invention, a vacuum forming system can be disposed within the water trough in order to prevent deformation of the outer surface of cable core 14. In this regard, the vacuum system can include a pair of plates, each of which defines a hole through which cable core 14 passes. By drawing a vacuum through a space defined between the plates, water can be drawn from both the upstream and downstream directions so as to form a thin layer of water between the edges of the holes and cable core 14. Although the thin layer of water follows the shape established by the holes, the water lubricates the passage of cable core 14 through the plates and serves to smooth the outer surface of cable core 14. Fiber optic cable 10 can then be completed by drawing a plurality of optical fibers 20, such as a plurality of optical fiber ribbons, from respective payoffs and inserting optical fibers 20 within respective slots defined by cable core 14. Thereafter, cable core 14 and optical fibers 20 are passed through another extruder that extrudes protective jacket 22 therearound.

Cable core 14 can be extruded in either a single step or in two steps. In a two-step process, an inner portion 14a of cable core 14 is initially extruded around strength member 12 so as to at least partially define voids 24 that extend lengthwise through cable core 14. In this regard, central strength member 12 can be drawn through extruder 40 including an extrusion die 44 as shown in FIGS. 4 and 5 and a molten thermoplastic material can be extruded thereabout to form the inner portion 14a of cable core 14. While the extrusion of the inner portion 14a of cable core 14 can completely define the plurality of voids, the extrusion of the inner portion of cable core 14 can, instead, define the majority, but not all of each void as shown by the cross-sectional view of FIG. 6. In this regard, the inner surface of extrusion die 44 includes void forming structures 47 (FIGS. 4–5) that define the majority of each void. After passing through extruder 40 including extrusion die 44 of FIGS. 4 and 5, the inner portion of cable core 14 can be at least partially cooled, typically by passing the inner portion of cable core 14 through a water trough, prior to extruding the outer portion 14b (FIG. 1) thereabout. In instances in which the inner portion 14a only partially defines each void, the outer portion 14b surrounds the inner portion 14a and serves to complete the definition of voids 24. Additionally, the outer portion 14b defines the outwardly opening slots 16 that will subsequently receive the optical fibers. Although outer portion 14b can be extruded over the inner portion 14a without significant intrusion of the molten thermoplastic material into the voids, inner portion 14a can be wrapped or surrounded by a tape (not illustrated) prior to extruding the outer portion 14b thereabout, if so desired. Typically, the tape would be formed of mylar, although tapes formed of other materials including fire-retardant or water-blocking materials can be utilized.

In an alternative embodiment, the method of the present invention can extrude cable core 14 in two steps even though the inner portion of cable core 14 completely defines voids 24. In this embodiment, central strength member 12 is drawn through an extruder 40, such as depicted in FIG. 7. In addition to extruder 40, the extrusion apparatus also preferably includes a plurality of void forming members 52, for example, calibration vanes or tubes. Void forming members 52 extend through the internal cavity defined by extruder 40 such that the molten thermoplastic material is extruded around strength member 12 and around void forming members 52. Void forming members 52 therefore define the voids 24 in cable core 14. Although not necessary, void forming members 52 can extend beyond the internal cavity, through die opening 45 and into the water trough to prevent undesirable deformation and distortion of voids 24. In addition, void forming members 52 can define lengthwise extending tubular passageways through which pressurized gas can be forced, or non-pressurized gas or air can be drawn, thereby further maintaining the desired shape of voids 24. Void forming members 52 can have different configurations depending upon the type of voids that are desired. Linear void forming members 52 can form linear voids 24. However, if voids 24 are to have a helical configuration, void forming members 52 can also have a helical configuration around central strength member 12. In order to facilitate the formation of helical voids 24, central strength member 12 can also be rotated as known to those skilled in the art. Once the inner portion of cable core 14 has been defined as shown in FIG. 7A, the inner portion of cable core 14 can be at least partially cooled, such as by passing the inner portion of cable core 14 through a water trough. The inner portion of the cable core can then be passed through another extrusion die that extrudes the outer portion of cable core 14 thereover. As described above, the outer portion of cable core 14 defines outwardly opening slots 16.

As an alternative to the two-step process described above, cable core 14 can be defined in a single extrusion step in which the plurality of voids 24 and the plurality of slots 16 are concurrently defined in the extrudate. As described in conjunction with the embodiment of FIG. 7, in the single step process, the extruder would also include a plurality of void forming members. However, the exit profile of extrusion die 44 would comprise a number of inwardly projecting slot forming members. As depicted in FIG. 8, cable core 14 can therefore be extruded in a single step. As shown in FIG. 8, ribs 18 that extend radially between and separate slots 16 can also define lengthwise extending voids 54 of, for example, circular or triangular shape to further reduce the weight of the resulting cable core, if so desired.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fiber optic cable product comprising:
   an elongate cable comprising a thermoplastic material and a strength member mechanically coupled to said thermoplastic material by extrusion of said thermoplastic material on said strength member, said cable core comprising at least two lengthwise extending slots not in communication with each other, at least one slot having at least one optical fiber therein, said cable core also defining a plurality of voids formed in said thermoplastic material between said strength member and said slots, said voids being disposed in a generally symmetrical arrangement about said strength member, and said voids being separated from said slots by a layer of said thermoplastic material.

2. A fiber optic cable product according to claim 1 wherein each void defined by said cable core has a circular shape in lateral cross-section.

3. A fiber optic cable product according to claim 1 wherein each void defined by said cable core has a lateral cross-sectional shape that becomes increasingly more narrow in a radially inward direction.

4. A fiber optic cable product according to claim 1 wherein said cable core comprises a web extending between and separating adjacent voids, said web having a lateral cross-sectional thickness of at least 1 millimeter.

5. A fiber optic cable product according to claim 1 wherein said cable core defines the slots and the voids such that at least some voids are radially aligned with respective slots.

6. A fiber optic cable product according to claim 1 wherein said cable core defines the slots and the voids such that at least some voids are staggered relative to the slots.

7. A fiber optic cable product according to claim 1 said void comprising at least one component therein selected from the group consisting of an optical fiber, a ripcord, a waterblocking grease, a superabsorbent material, an electrical conductor, a strength member, and a foamed plastic.

8. A fiber optic cable product according to claim 1 wherein said cable core further comprises two adjacent slots having respective frangible portions that can be broken by pulling a rib therebetween for access to one or more voids.

9. A fiber optic cable product according to claim 1 wherein said cable core comprises radially extending ribs separating the lengthwise extending slots, at least one of said ribs also defining a lengthwise extending void.

10. A fiber optic cable product according to claim 1 further comprising:
    a plurality of optical fibers disposed within the respective slots; and a protective jacket surrounding said cable core and said plurality of optical fibers.

11. A fiber optic cable product comprising:
an elongate cable comprising a thermoplastic material and a strength member mechanically coupled to said thermoplastic material by extrusion of said thermoplastic material on said strength member, said cable core comprising at least two lengthwise extending slots not in communication with each other, at least one slot having at least one optical fiber therein, said cable core also defining a plurality of lengthwise extending voids formed in said thermoplastic material between said strength member and said slots, said voids being separated from said slots by a layer of said thermoplastic material.

12. A fiber optic cable product according to claim 11 wherein each void defined by said cable core has a circular shape in lateral cross-section.

13. A fiber optic cable product according to claim 11 wherein each void defined by said cable core has a lateral cross-sectional shape that becomes increasingly more narrow in a radially inward direction.

14. A fiber optic cable product according to claim 13 wherein each void defined by said cable core has a helical configuration.

15. A fiber optic cable product according to claim 11 wherein said cable core comprises a web extending between and separating adjacent voids, said web having a lateral cross-sectional thickness of at least 1 millimeter.

16. A fiber optic cable product according to claim 11 wherein said cable core defines the slots and the voids such that at least some voids are radially aligned with respective slots.

17. A fiber optic cable product according to claim 11 wherein said cable core defines the slots and the voids such that at least some voids are staggered relative to the slots.

18. A fiber optic cable product according to claim 11 further comprising a ripcord disposed within a respective void.

19. A fiber optic cable product according to claim 18 wherein said cable core further comprises a web between the void in which said ripcord is disposed and a slot aligned with the void, said web having a portion of reduced thickness for facilitating separation of said web by said ripcord.

20. A fiber optic cable product according to claim 11 wherein said cable core comprises radially extending ribs separating the lengthwise extending slots, at least one of said ribs also defining a lengthwise extending void.

21. A fiber optic cable product according to claim 11 further comprising:
a plurality of optical fibers disposed within the respective slots; and
a protective jacket surrounding said cable core and said plurality of optical fibers.

22. A method for forming a fiber optic cable product comprising:
providing a lengthwise extending strength member;
extruding a cable core comprising a thermoplastic material around the strength member such that the cable core is mechanically coupled thereto, said extruding step comprising:
defining a plurality of voids proximate the strength member and extending lengthwise through the cable core;
defining a plurality of outwardly opening slots extending lengthwise along the cable core, at least some of said slots not being in communication with each other and separated from said voids by a layer of said thermoplastic material; and
inserting at least one optical fiber into at least one of said slots.

23. A method according to claim 22 wherein said extruding step comprises:
initially extruding an inner portion of the cable core around the strength member, said initial extrusion comprising at least partially defining the plurality of voids that extend lengthwise through the cable core;
at least partially curing the inner portion of the cable core; and
subsequently extruding an outer portion of the cable core around the at least partially cured inner portion of the cable core, said subsequent extrusion comprising defining the plurality of slots that also extend lengthwise along the cable core.

24. A method according to claim 22 wherein said extruding step comprises concurrently defining the plurality of voids and the plurality of slots.

25. A method according to claim 22 wherein said extruding step comprises:
providing a plurality of void forming members; and
extruding the cable core around the calibration veins with each calibration vein defining a respective void.

26. A method according to claim 25 further comprising applying a positive pressure within the void forming members.

27. A method according to claim 22 further comprising:
disposing optical fibers in the slots defined by the cable core; and
extruding a protective jacket around the cable core and the optical fibers.

28. An apparatus for extruding at least a portion of a cable core having an outer surface with a predetermined shape, the apparatus comprising:
an extruder comprising:
an extruder die that defines a die opening, the die opening defining the predetermined shape of the outer surface of the cable core; and
an extruder tip that cooperates with the extruder die to at least partially define an internal cavity into which molten thermoplastic material is introduced prior to being forced through the die opening; and
a plurality of void forming members that extend from said extruder tip and through at least a portion of the internal cavity of said extruder to define a plurality of voids that are internal to the cable core without opening through the outer surface of the cable core.

29. An apparatus according to claim 28 wherein said void forming members are tubes that define lengthwise extending passageways such that a gas can be injected through said calibration veins and into the voids defined by the cable core.

30. An apparatus according to claim 28 wherein said void forming members extend outwardly from the internal cavity and through the die opening defined by said extruder die.

31. An apparatus according to claim 28 wherein said extruder die comprises a plurality of projections that extend radially inward into the die opening in order to shape the outer surface of the cable core so as to define a plurality of slots.

* * * * *